United States Patent
Li et al.

(10) Patent No.: US 10,971,705 B2
(45) Date of Patent: Apr. 6, 2021

(54) POUCH FOR SECONDARY BATTERY AND DIE FOR FORMING THE SAME

(71) Applicant: LG Chem, Ltd., Seoul (KR)

(72) Inventors: Dai Hien Li, Daejeon (KR); Woo Yong Lee, Daejeon (KR); Jae Hoon Yoo, Daejeon (KR); Shin Hwa Lee, Daejeon (KR); Kieun Sung, Daejeon (KR); Tae Young Moon, Daejeon (KR); Seung Cheol Choi, Daejeon (KR)

(73) Assignee: LG Chem, Ltd.

( * ) Notice: Subject to any disclaimer, the term of this patent is extended or adjusted under 35 U.S.C. 154(b) by 74 days.

(21) Appl. No.: 16/253,960

(22) Filed: Jan. 22, 2019

(65) Prior Publication Data
US 2019/0229301 A1 Jul. 25, 2019

(30) Foreign Application Priority Data
Jan. 24, 2018 (KR) ........................ 10-2018-0008645

(51) Int. Cl.
*H01M 2/02* (2006.01)
*B29C 33/42* (2006.01)
*B29L 31/00* (2006.01)

(52) U.S. Cl.
CPC .......... *H01M 2/0207* (2013.01); *B29C 33/42* (2013.01); *H01M 2/0275* (2013.01); *B29L 2031/7146* (2013.01)

(58) Field of Classification Search
CPC ... H01M 2/0207; H01M 2/0275; B23C 33/42; B29L 2031/22; B29L 2031/7146; B29C 33/42
See application file for complete search history.

(56) References Cited

U.S. PATENT DOCUMENTS

2011/0287308 A1* 11/2011 Kim .................... H01M 2/0207
429/176
2013/0243548 A1* 9/2013 Yamamoto ........... B21D 22/203
413/1

(Continued)

FOREIGN PATENT DOCUMENTS

JP       2001291497 A    10/2001
KR        200207948 Y1    1/2001

(Continued)

*Primary Examiner* — Gregg Cantelmo
(74) *Attorney, Agent, or Firm* — Lerner, David, Littenberg, Krumholz & Mentlik, LLP

(57) ABSTRACT

Provided are a pouch for a secondary battery, which is capable of minimizing a folded area of a bridge part of the pouch that is manufactured by folding two accommodation parts to overlap each other, and a die for forming the pouch for the secondary battery. The pouch for the secondary battery includes a lower accommodation part accommodating an electrode assembly therein, an upper accommodation part covering an opening of the lower accommodation part, and a bridge part connecting the lower accommodation part to the upper accommodation part. When the lower accommodation part and the upper accommodation part are unfolded, a height of the bridge part, which is measured from a bottom surface of the lower accommodation part, is lower than that of the lower accommodation part, which is measured from the bottom surface of the lower accommodation part.

4 Claims, 7 Drawing Sheets

(56) References Cited

U.S. PATENT DOCUMENTS

| | | | |
|---|---|---|---|
| 2013/0252081 A1* | 9/2013 | Kim | H01M 2/0207 |
| | | | 429/186 |
| 2017/0133707 A1* | 5/2017 | Han | H01M 10/04 |
| 2018/0219245 A1 | 8/2018 | Choi et al. | |

FOREIGN PATENT DOCUMENTS

| | | |
|---|---|---|
| KR | 20120051424 A | 5/2012 |
| KR | 20170022156 A | 3/2017 |
| KR | 20170052061 A | 5/2017 |
| KR | 20170069980 A | 6/2017 |
| WO | WO-2017078437 A1 * 5/2017 | .......... H01M 2/0275 |

* cited by examiner

POUCH FOR SECONDARY BATTERY AND DIE FOR FORMING THE SAME

CROSS-REFERENCE TO RELATED APPLICATIONS

This application claims the priority of Korean Patent Application No. 10-2018-0008645 filed on Jan. 24, 2018, in the Korean Intellectual Property Office, the disclosure of which is incorporated herein by reference.

BACKGROUND OF THE INVENTION

Field of the Invention

The present invention relates to a pouch for a secondary battery and a die for forming the pouch for the secondary battery, and more particularly, to a pouch for a secondary battery, which is capable of minimizing a folded area of a bridge part of the pouch that is manufactured by folding two accommodation parts to overlap each other, and a die for forming the pouch for the secondary battery.

Description of the Related Art

Secondary batteries are classified according to an electrode assembly having a positive electrode/separator/negative electrode structure.

Representatively, exemplary examples of the electrode assembly include a jelly-roll type electrode assembly in which long sheet-shaped positive electrodes and negative electrodes are wound with a separator therebetween, a stack type electrode assembly in which a plurality of positive electrodes and negative electrodes, which are cut into units, each of which has a predetermined size, are sequentially stacked with a separator therebetween, a stack/folding type electrode assembly in which bi-cells or full cells, which are stacked with a separator therebetween, are wound, and the like.

Recently, the pouch type battery in which the stack/folding type electrode assembly is built in a pouch-type battery case provided as an aluminum lamination sheet is attracting much attention due to its low manufacturing cost, small weight, easy shape deformation, and the like, and thus, its usage is gradually increasing.

The pouch type secondary battery includes an electrode assembly, electrode tabs extending from the electrode assembly, an electrode terminal welded to the electrode tabs, and a pouch exterior accommodating the electrode assembly.

The pouch type secondary battery according to the related art is disclosed in Korean Utility Model No. 0207948.

The pouch exterior may be formed to have one accommodation part or two accommodation parts according to a thickness of the electrode assembly. The formed pouch is folded by a bridge.

However, when the pouch having the two accommodation parts is folded, folding may occur at a portion in which the bridge is formed to cause deterioration in processability such as dimensions of the assembled pouch and poor appearance such as dent and the like.

SUMMARY OF THE INVENTION

An aspect of the present invention provides a pouch for a secondary battery, in which a bridge part connecting two accommodation parts to each other is shortened in length to minimize elongation of the bridge part of the folded pouch, and a die for forming the pouch for the secondary battery.

According to another aspect of the present invention, there is provided a pouch for a secondary battery, including: a lower accommodation part accommodating an electrode assembly therein; an upper accommodation part covering an opening of the lower accommodation part; and a bridge part connecting the lower accommodation part to the upper accommodation part, wherein, when the lower accommodation part and the upper accommodation part are unfolded, a height of the bridge part, which is measured from a bottom surface of the lower accommodation part, is lower than that of the lower accommodation part, which is measured from the bottom surface of the lower accommodation part.

When the lower accommodation part and the upper accommodation part are unfolded, a height of the bridge part, which is measured from a bottom surface of the upper accommodation part, may be lower than that of the upper accommodation part, which is measured from the bottom surface of the upper accommodation part.

When the lower accommodation part and the upper accommodation part are unfolded, a depth measured from an upper end of the lower accommodation part to a lower end of the lower accommodation part may be the same as that measured from an upper end of the upper accommodation part to a lower end of the upper accommodation part.

According to another aspect of the present invention, there is provided a die for forming a pouch for a secondary battery, which includes a lower accommodation part accommodating the electrode assembly therein, an upper accommodation part covering an opening of the lower accommodation part, and a bridge part connecting the lower accommodation part to the upper accommodation part, the die including: an outer part; a groove part for the upper accommodation part, which is connected to the outer part and recessed to define the upper accommodation part; a groove part for the lower accommodation part, which is connected to the outer part and recessed to define the lower accommodation part; and a groove part for the bridge part, which is connected to be stepped from the outer part through an inclined stepped surface to provide the bridge part and is configured to connect the groove part for the upper accommodation part to the groove part for the lower accommodation part, wherein a depth of the groove part for the bridge part, which is measured from the outer part has a value greater than 0.

A depth of the groove part for the lower accommodation part, which is measured from a top surface of the outer part to a bottom surface of the groove part for the lower accommodation part may be greater than that of the groove part for the upper accommodation part, which is measured from the top surface of the outer part to a bottom surface of the groove part for the upper accommodation part.

A depth measured from a top surface of the outer part to a bottom surface of the groove part for the lower accommodation part may be the same as that measured from the top surface of the outer part to a bottom surface of the groove part for the upper accommodation part.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
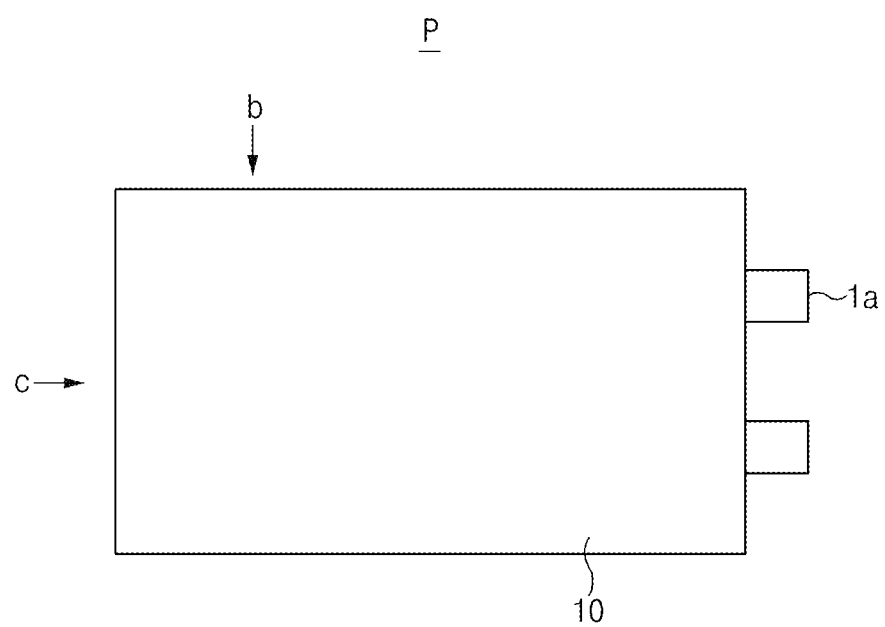
FIG. 1 is a plan view illustrating a secondary battery to which a pouch for the secondary battery is applied according to an embodiment of the present invention.

Hereinafter, a pouch for secondary battery and a die for forming the pouch for the secondary battery according to preferred embodiments of the present invention will be described in detail with reference to the accompanying drawings.

Terms or words used in the specification and claims should not be construed as limited to a lexical meaning, and should be understood as appropriate notions by the inventor based on that he/she is able to define terms to describe his/her invention in the best way to be seen by others. Therefore, embodiments and drawings described herein are simply exemplary and not exhaustive, and it will be understood that various equivalents may be made to take the place of the embodiments.

In the drawings, the dimension of each of components or a specific portion constituting the component is exaggerated, omitted, or schematically illustrated for convenience in description and clarity. Thus, the dimension of each element does not entirely reflect an actual size. Moreover, detailed descriptions related to well-known functions or configurations will be ruled out in order not to unnecessarily obscure subject matters of the present invention.

Figure 2:
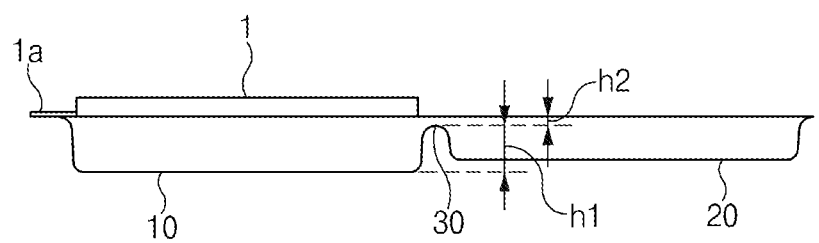
FIG. 2 is a development view illustrated in a direction b of FIG. 1.

FIG. 1 is a plan view illustrating a secondary battery to which a pouch for the secondary battery is applied according to an embodiment of the present invention, and FIG. 2 is a development view illustrated in a direction b of FIG. 1.

As illustrated in FIGS. 1 and 2, a pouch P for a secondary battery according to an embodiment of the present invention includes a lower accommodation part 10 accommodating the electrode assembly 1 therein, an upper accommodation part 20 covering an opening the lower accommodation part 10, and a bridge part 30 connecting the lower accommodation part 10 to the upper accommodation part 20.

As illustrated in FIG. 2, when the lower accommodation part 10 and the upper accommodation part 20 are unfolded, a height of the bridge part 30, which is measured from a bottom surface of the lower accommodation part 10, is lower than that of the lower accommodation part 10, which is measured from the bottom surface of the lower accommodation part 10.

Also, when the lower accommodation part 10 and the upper accommodation part 20 are unfolded, a height of the bridge part 30, which is measured from a bottom surface of the upper accommodation part 20, is lower than that of the upper accommodation part 20, which is measured from the bottom surface of the upper accommodation part 20.

For example, the electrode assembly 1 may be manufactured by stacking a positive electrode coated with a positive electrode active material, a negative electrode coated with a negative electrode active material, and a separator disposed between the positive electrode and the negative electrode.

The positive electrode may include a positive electrode active material portion coated with the positive electrode active material and a positive electrode non-coating portion which is not coated with the positive electrode active material.

The negative electrode may include a negative electrode active material portion coated with the negative electrode active material and a negative electrode non-coating portion which is not coated with the negative electrode active material.

In the electrode assembly 1, electrode tabs 1a may be attached to the positive electrode non-coating portions and the negative electrode non-coating portions, respectively. The electrode tabs 1a may pass through the pouch P to protrude to the outside.

The pouch P seals the electrode assembly 1 and accommodates an electrolyte together with the electrode assembly.

The lower accommodation part 10 may define a lower portion of a portion of the pouch P to provide an accommodation space having an opened upper side, which accommodates a portion of the electrode assembly 1 and the electrolyte.

The upper accommodation part 20 may define an upper portion of a portion of the pouch P and be coupled to an upper portion of the lower accommodation part 10 to cover the opened accommodation space of the lower accommodation part 10.

The upper accommodation part 20 may be coupled to the upper portion of the lower accommodation part 10 to provide an accommodation space having an opened lower side, which accommodates a remaining portion of the electrode assembly 1 that is accommodated in the lower accommodation part 10.

A coupling part of the upper accommodation part 20 and the lower accommodation part 10 may be sealed.

As described above, the accommodation space of the lower accommodation part 10 and the accommodation space of the upper accommodation part 20 may communicate with each other to accommodate the electrode assembly 1 and the electrolyte.

The bridge part 30 may be disposed between the lower accommodation part 10 and the upper accommodation part 20. The bridge part 30 may connect the lower accommodation part 10 to the upper accommodation part 20 and be folded to couple the lower accommodation part 10 to the upper accommodation part 20.

When the lower accommodation part 10 and the upper accommodation part 20 are unfolded, a height h1 corresponding to a length measured from the bottom to the bridge part 30 may be about 0.1 mm to about 1.5 mm.

If the height h1 is less than about 0.1 mm, it may be difficult to couple the lower accommodation part 10 to the upper accommodation part 20 by folding the bridge part 30 due to the position of the bridge part 30, or a size of the pouch P may be too small. If the height h1 exceeds about 1.5 mm, the size of the pouch P may be too large.

When the lower accommodation part 10 and the upper accommodation part 20 are unfolded, a depth h2 of the bridge part 30, which is measured from an upper end of each of the lower accommodation part 10 and the upper accommodation part 20 may range from about 0.03 mm to about 0.1 mm.

If the depth h2 is less than about 0.03 mm, when the bridge part 30 is folded to couple the lower accommodation part 10 to the upper accommodation part 20, an outer appearance issue such as dent and the like may occur on the bridge part 30 due to the elongation. If the depth h2 exceeds about 0.1 mm, it may be difficult to couple the lower accommodation part 10 to the upper accommodation part 20 by folding the bridge part 30, or the size of the pouch P may be too small.

Figure 3:
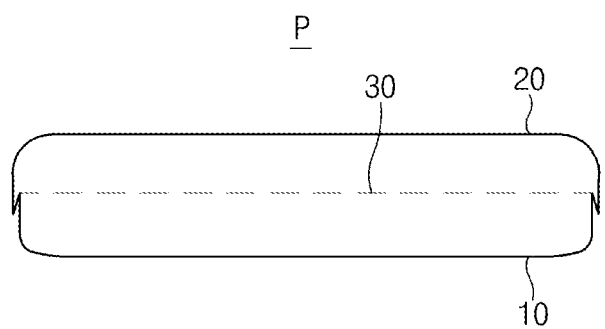
FIG. 3 is a rear view illustrating a bridge part in a direction c of FIG. 1.

FIG. 3 is a rear view illustrating the bridge part in a direction c of FIG. 1.

As illustrated in FIG. 3, when the outer appearance issue such as the dent and the like occurs on the bridge part 30 of the assembled pouch P, dimensions of the pouch P may not constant, and thus, processability may be deteriorated, and fixing force of the electrode assembly 1 accommodated in the pouch P may be reduced.

Thus, the bridge part 30 according to an embodiment of the present invention may have the depth h2 of about 0.03 mm to about 0.1 mm to reduce the elongation, thereby minimizing the remaining region of the pouch and a dimensional deviation of the assembled pouch P, increasing in fixing force of the electrode assembly 1, and realizing an elegant outer appearance.

In the pouch for the secondary battery according to an embodiment of the present invention, when the lower accommodation part 10 and the upper accommodation part 20 are unfolded, a depth measured from an upper end of the lower accommodation part 10 to a lower end of the lower accommodation part 10 may be greater than that measured from an upper end of the upper accommodation part 20 to a lower end of the upper accommodation part 20.

That is, since the lower accommodation part 10 has a size greater than that of the upper accommodation part 20, most of the electrode assembly 1 and the electrolyte may be accommodated in the lower accommodation part 10, and a portion of the electrode assembly 1 may be accommodated in the upper accommodation part 20. In addition, the opening of the lower accommodation part 20 may be covered to facilitate the sealing of the coupling portion of the upper accommodation part 20 and the lower accommodation part 10, and the upper accommodation part 20 may be easily coupled to the upper portion of the lower accommodation part 10.

Figure 4:
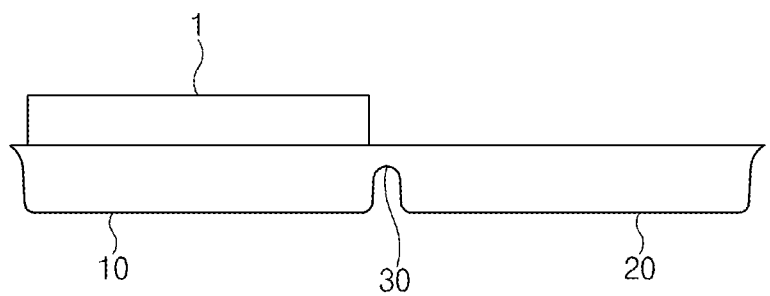
FIG. 4 is a development view of a pouch for a secondary battery according to another embodiment of the present invention.

FIG. 4 is a development view of a pouch for a secondary battery according to another embodiment of the present invention.

As illustrated in FIG. 4, in a pouch for a secondary battery according to another embodiment of the present invention, when a lower accommodation part 10 and an upper accommodation part 20 are unfolded, a depth measured from an upper end of the lower accommodation part 10 to a lower end of the lower accommodation part 10 may be the same as that measured from an upper end of the upper accommodation part 20 to a lower end of the upper accommodation part 20.

That is, since the lower accommodation part 10 has the same size as the upper accommodation part 20, when a pouch P is assembled, the lower accommodating portion 10 and the upper accommodating portion 20 may be assembled without being distinguished from each other, and thus, the assembling may be easy.

Hereinafter, a die for forming the above-described pouch for the secondary battery will be described in detail with reference to the accompanying drawings.

Figure 5:
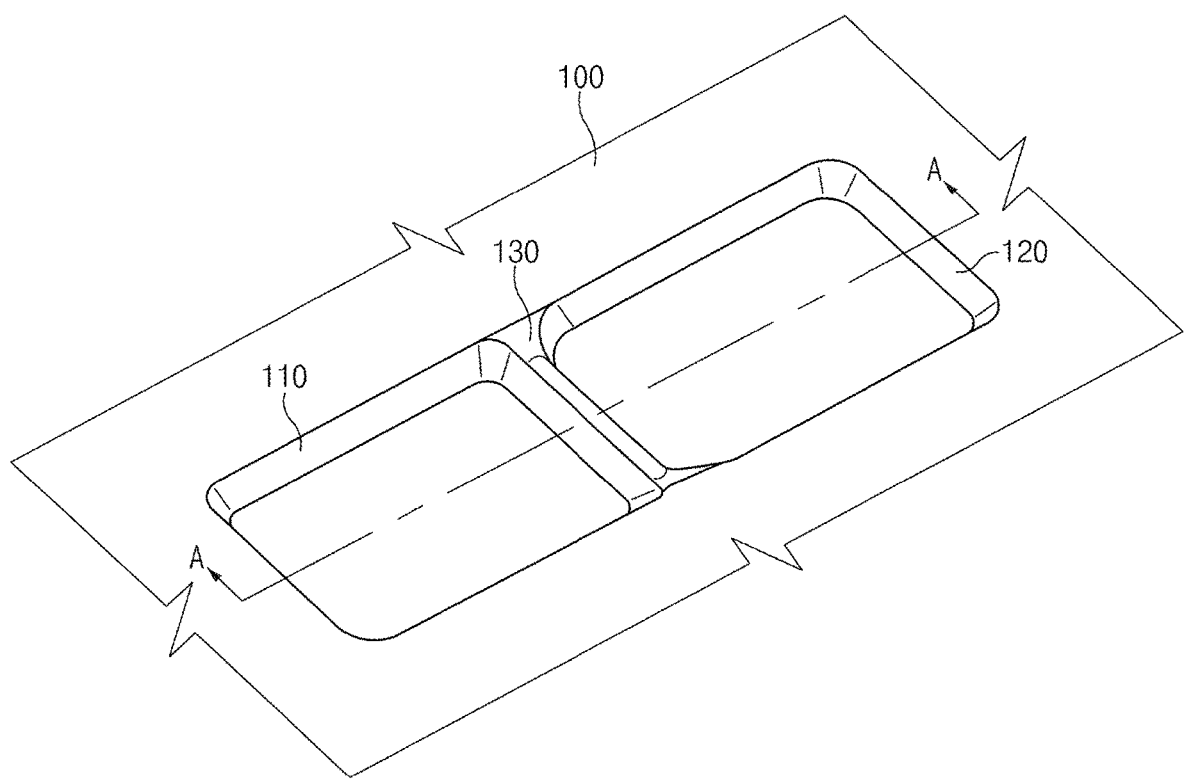
FIG. 5 is a perspective view illustrating a main part of a die for forming the pouch for the secondary battery according to an embodiment of the present invention.
Figure 6:
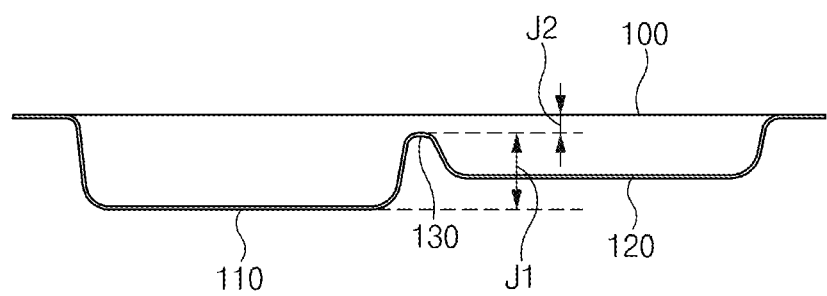
FIG. 6 is a cross-sectional view illustrating a main part, taken along line A-A of FIG. 5.

FIG. 5 is a perspective view illustrating a main part of a die for forming the pouch for the secondary battery according to an embodiment of the present invention, and FIG. 6 is a cross-sectional view illustrating a main part, taken along line A-A of FIG. 5.

As illustrated in FIGS. 5 and 6, a die for forming the pouch for the secondary battery according to an embodiment of the present invention, which includes the lower accommodation part 10 accommodating the electrode assembly 1, the upper accommodation part 20 covering the opening of the lower accommodation part 10, and the bridge part 30 connecting the lower accommodation part 10 to the upper accommodation part 20, includes an outer part 100, a groove part 120 for the upper accommodation part, which is connected to the outer part 100 and recessed to define the upper accommodation part 20, a groove part 110 for the lower accommodation part, which is connected to the outer part 100 and recessed to define the lower accommodation part 10, and a groove part 130 for the bridge part, which is connected to be stepped from the outer part 100 through an inclined stepped surface to provide the bridge part 30 and is configured to connect the groove part 120 for the upper accommodation part to the groove part for the lower accommodation part.

Particularly, a depth of the groove part 130 for the bridge part, which is measured from the outer part 100 may be greater than 0.

The outer part 100 may be a main body of the die and have flat top surface.

The groove part 110 for the upper accommodation part may have a shape corresponding to an outer appearance of the upper accommodation part 20 of the pouch P.

The groove part 120 for the lower accommodation part may have a shape corresponding to an outer appearance of the lower accommodation part 10 of the pouch P.

A depth of the groove part 110 for the lower accommodation part, which is measured from a top surface of the outer part 100 to a bottom surface of the groove part 110 for the lower accommodation part may be greater than that of the groove part 120 for the upper accommodation part, which is measured from the top surface of the outer part 100 to a bottom surface of the groove part 120 for the upper accommodation part.

This is done for manufacturing the upper and lower accommodation parts 20 and 10 so that the lower accommodation part 10 formed by the groove part 110 for the lower accommodation part has an inner accommodation portion having a size greater than that of an inner accommodation portion of the upper accommodation part 20 formed by the groove part 120 for the upper accommodation part.

The groove part 130 for the bridge part may be defined between the groove part 120 for the upper accommodation part and the groove part 110 for the lower accommodation part. Also, the groove part 130 for the bridge part, which is formed to be stepped from the outer part 100 by the stepped surface inclined from the outer part 100, may have a length of about 0.33 mm to about 0.1 mm.

That is, a depth J2 of the groove part 130 for the bridge part, which is measured from the top surface of the outer part 100, may range from about 0.3 mm to about 0.1 mm.

The reason in which the groove part 130 for the bridge part has the depth J2 of about 0.03 mm to about 0.1 mm is for manufacturing the bridge part 30 formed by the groove part 130 for the bridge part so that the depth J2 of the bridge part 30, which is measured from an upper end of each of the lower accommodation part 10 and the upper accommodation part 20, ranges from about 0.03 mm to about 0.1 mm when the lower accommodation part 10 and the upper accommodation part 20 are unfolded.

Also, a height J1 measured from the bottom surface of the groove part 130 for the bridge part may range from about 0.1 mm to about 1.5 mm. Here, the reason in which the groove part 130 for the bridge part has the height J1 of about 0.1 mm to about 1.5 mm is for manufacturing the bridge part 30, which is formed by the groove part 130 for the bridge part, so that the bridge part 30 has a height H1 of about 0.1 mm to about 1.5 mm when the lower accommodation part 10 and the upper accommodation part 20 are unfolded.

Figure 7:
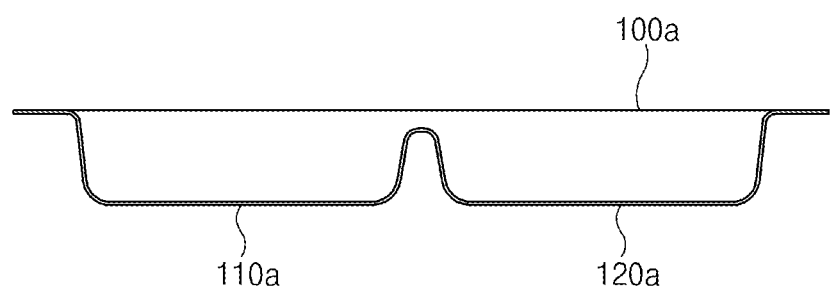
FIG. 7 is a cross-sectional view illustrating a main part of a die for forming the pouch for the secondary battery according to another embodiment of the present invention.

FIG. 7 is a cross-sectional view illustrating a main part of a die for forming the pouch for the secondary battery according to another embodiment of the present invention.

As illustrated in FIG. 7, in the die for forming the pouch for the secondary battery according to another embodiment of the present invention, a depth measured from a top surface of an outer part 100a to a bottom surface of a groove part 110a for a lower accommodation part may be the same as that measured from the top surface of the outer part 100a to a bottom surface of a groove part 120a for an upper accommodation part.

That is, the lower accommodation part 10 and the upper accommodation part 20 of a pouch P manufactured by the die for forming the pouch for the secondary battery according to another embodiment of the present invention may have the same inner accommodation portion.

In the pouch P manufactured by the die for forming the pouch for the secondary battery according to the foregoing various embodiments, a wall of each of the upper accommodation part 20 and the lower accommodation part 10 may be reduced in length in a section of a bridge part 30 between the upper accommodation part 20 and the lower accommodation part 10. Thus, when the bridge part 30 is folded to assemble the pouch P, the elongation of the bridge part 30 may be reduced by the reduced length of the wall to prevent the outer appearance issue such as the dent and the like from occurring.

In addition, the elongation of the bridge part 30 may be reduced so that the electrode assembly 1 accommodated in the assembled pouch P is more closely attached in the inner space of the pouch P to improve the fixing force of the electrode assembly 1 with respect to the pouch P.

As described above, according to the present invention, the elongation of the bridge part of the assembled pouch may be minimized.

According to the present invention, the elongation of the bridge part of the pouch may be minimized to allow the pouch to more effectively fix the electrode assembly therein.

According to the present invention, the elongation of the bridge part of the assembled pouch may be minimized to prevent the dimensional processability of the pouch from being deteriorated.

According to the present invention, the elongation of the bridge part of the assembled pouch may be minimized to prevent the outer appearance issue such as the dent of the pouch from occurring.

Although the pouch for the secondary battery and the die for forming the pouch for the secondary battery according to the present invention has been described above with reference to the exemplary drawings, various changes and modifications may be made thereto by one skilled in the art without departing from the scope and spirit of the invention as set forth in the appended claims.

What is claimed is:

1. A pouch for a secondary battery, comprising:
   a lower accommodation part accommodating an electrode assembly therein;
   an upper accommodation part covering an opening of the lower accommodation part; and
   a bridge part connecting the lower accommodation part to the upper accommodation part,
   wherein, when the lower accommodation part and the upper accommodation part are unfolded, the bridge part has a U-shape cross section, and a height of the bridge part, which is measured from a bottom surface of the lower accommodation part, is lower than a height of the lower accommodation part, which is measured from the bottom surface of the lower accommodation part,
   wherein a height (h1) corresponding to a length measured from the bottom of the accommodation part to the bridge part is 0.1 mm to 1.5 mm, and a depth (h2) of the bridge part is from 0.03 mm to 0.1 mm.

2. The pouch of claim 1, wherein, when the lower accommodation part and the upper accommodation part are unfolded, a height of the bridge part, which is measured from a bottom surface of the upper accommodation part, is lower than a height of the upper accommodation part, which is measured from the bottom surface of the upper accommodation part.

3. The pouch of claim 1, wherein, when the lower accommodation part and the upper accommodation part are unfolded, a depth measured from an upper end of the lower accommodation part to a lower end of the lower accommodation part is the same as that measured from an upper end of the upper accommodation part to a lower end of the upper accommodation part.

4. A die for forming the pouch for the secondary battery of claim 1, which comprises the lower accommodation part accommodating the electrode assembly therein, the upper accommodation part covering the opening of the lower accommodation part, and the bridge part connecting the lower accommodation part to the upper accommodation part, the die comprising:
   an outer part;
   a groove part for the upper accommodation part, which is connected to the outer part and recessed to define the upper accommodation part;
   a groove part for the lower accommodation part, which is connected to the outer part and recessed to define the lower accommodation part; and
   a groove part for the bridge part, the groove part for the bridge part has a U-shape cross section, and which is connected to be stepped from the outer part through an inclined stepped surface to provide the bridge part and is configured to connect the groove part for the upper accommodation part to the groove part for the lower accommodation part, wherein a depth of the groove part for the lower accommodation part, which is measured from the top surface of the outer part to a bottom surface of the groove part for the lower accommodation part is greater than a depth of the groove part for the upper accommodation part, which is measured from the top surface of the outer part to a bottom surface of the groove part for the upper accommodation part
   wherein a depth (J2) of the groove part for the bridge part, which is measured from a top surface of the outer part ranges from about 0.03 mm to about 0.1 mm wherein a height (J1) measured from a bottom surface of the groove part for the bridge part ranges from about 0.1 mm to about 1.5 mm.

* * * * *